Figure 1:
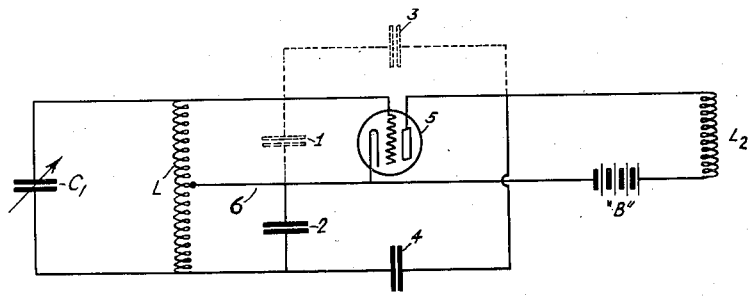

July 31, 1934.                W. VAN B. ROBERTS                1,968,104
AMPLIFYING SYSTEM Filed July 8, 1929

INVENTOR
WALTER VAN B. ROBERTS
BY
ATTORNEY

Patented July 31, 1934

1,968,104

UNITED STATES PATENT OFFICE 1,968,104

AMPLIFYING SYSTEM

Walter van B. Roberts, Princeton, N. J., assignor to Radio Corporation of America, a corporation of Delaware Application July 8, 1929, Serial No. 376,712

11 Claims. (Cl. 179—171)

My present invention relates to amplifying systems, and, more particularly, to amplifying systems wherein the production of undesired oscillations is prevented.

It is a well-known fact, at the present time, that in an amplifier system oscillations will be produced when the input and output circuits contain certain types of reactances. It is, also, well-known that the oscillatory currents so produced interfere with the efficient reception, amplification and detection of the signals to be received and amplified by the amplifier system.

These undesirable oscillations are generated because of the amplifying action of the electron discharge tubes embodied in the amplifying system. The inherent capacities between the electron discharge tube electrodes creates a coupling between the input and output circuits of each tube in the amplifier, thus affording ideal conditions for generation of undesirable oscillations.

Several systems have been devised in the past to overcome this disadvantage inherent in amplifier operation. One of the well-known types of these systems is disclosed by C. W. Rice in United States Patent No. 1,334,118 in which there is impressed upon the circuits coupled by the inherent tube capacities, electromotive forces equal to and opposite in direction to those impressed upon the coupled circuits, whereby the effect of the electro capacity coupling is effectively neutralized. More specifically, a balancing capacity is provided for neutralizing the tube electrode capacities.

However, experience with these neutralized circuits has disclosed an additional source of undesirable oscillations, when reactances of a certain nature and value are employed in the input and output circuits of the amplifier tube. A system arranged for capacity neutralization has been found to provide a new path in which parasitic oscillations may be produced.

For example, in the usual Rice circuit, where balancing capacities are employed to neutralize the effect of inter-electrode capacities of the amplifier tubes by means of balancing capacities equal to inter-electrode capacities, parasitic oscillations may be generated if the inductance of the output circuit of the amplifier tube is of a small value, and the common path from the junction of the grid-filament capacity and its balancing capacity to the point on the input inductance which has the same potential as the filament, is of zero impedance.

Another way of explaining this phenomena of the production of parasitics in neutralized circuits is as follows: The parallel paths provided by the inter-electrode capacity and balancing capacity between the tube input and output circuits form a coupling between the inductive reactance in the input circuit and that in the output circuit of the system. Parasitic oscillations are thus sometimes generated.

The production of these parasitics is probably due to the fact that the alternating plate potential causes alternation of grid potential in opposite phase from that of the plate. It will at once be obvious that if the impedance of the common path, from the junction of the grid filament capacity and its balancing capacity to the point on the input coil which has the same potential as the filament, has a very large impedance, alternations of the plate potential will cause similar phase alternations of grid potential, so that oscillation can never occur. The circuit is "degenerative", i. e., the feed-back is anti-regenerative. However, the amplification will be reduced, and this is undesirable.

Consequently, my invention consists in assigning such a value to the impedance of the common path, referred to above, that one of two beneficial results occur. In the first place, the impedance of said path may be of such a magnitude that the grid voltage produced by plate potential variation is ninety degrees out of phase with the plate variation, and hence does not either increase or decrease amplification, whereby oscillations cannot be produced. In the second place, the common path impedance may be of such a magnitude that the phase of the grid voltage is sufficiently close to ninety degrees so that oscillations are not produced in the actual circuit employed.

It is to be understood that it is not claimed that a parasite necessarily occurs in the well-known Rice circuit when the common path impendance is equal to zero, for, as a matter of fact, the plate circuit may readily be designed so that while the phase of the grid potential may be correct for oscillation, the magnitude is of such small value relative to plate potential that oscillations cannot occur.

Accordingly, one of the main objects of my present invention is to provide an amplifier circuit embodying one or more electron emission tubes, in which the coupling action of the inter-electrode capacities of a tube is neutralized, and the common path between the point on the input coil which has the same potential as the filament, and the junction of the grid-filament capacity and its balancing capacity, is so designed that any plate circuit whatever may be employed, without the production of oscillations at any frequency, and without damping of the tuned circuits or loss of amplification.

Another important object of the invention is to provide an amplifier circuit embodying an electron emission tube, including a plurality of electrodes, the input and output circuits of said tube embodying means for neutralizing the interelectrode capacities, and additional means, in the input circuit of the tube, to positively prevent the occurrence of any parasites, regardless of the nature of the output circuit of said tube.

Another object of the invention is to provide a multi-electrode amplifier tube in a receiving system, a reactive circuit, the electrodes of the tube being connected to electrically separate points in the reactive circuit, means to balance the inherent capacities between the electrodes, and additional means, electrically associated with the balancing means, to suppress parasites in the system due to the inherent tube capacities in cooperation with the balancing means.

Still another object of the invention is to provide a multi-electrode amplifier tube including input and output circuit reactances, the electrodes of the tubes being connected to electrically separate points in the said reactances, means to balance the inherent capacities between the electrodes, and additional means, including an impedance placed in the lead between the filament and the input circuit reactance, cooperating with the said balancing means to suppress parasites in the system due to the inherent tube capacities in cooperation with the balancing means.

Other objects of the invention are to improve generally the efficiency of the neutralized amplifier circuits, and to provide an amplifier of this nature which is durable and reliable in operation, and economical to manufacture.

The novel features which I believe to be characteristic of my invention are set forth in particularity in the appended claims, the invention itself, however, as to both its organization and method of operation will best be understood by reference to the following description taken in connection with the drawing in which I have indicated diagrammatically one circuit organization whereby my invention may be carried into effect.

Figure 2:
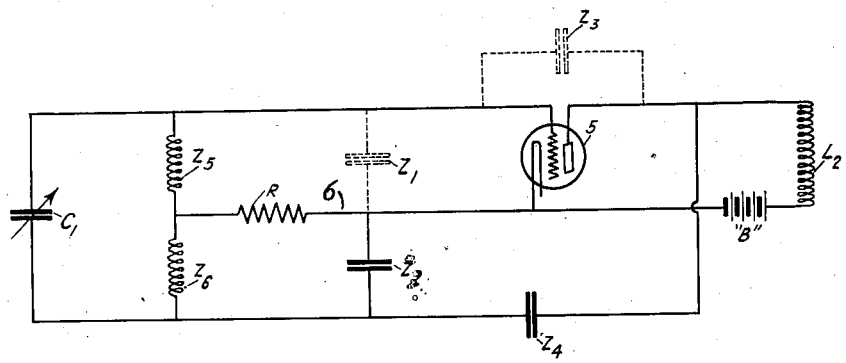

In the drawing,

Fig. 1 represents schematically a neutralized, electron discharge tube amplifier system, Fig. 2 shows a neutralized amplifier system, of the type shown in Fig. 1, embodying a parasite impeding element.

Referring to the accompanying drawing in which like characters of reference indicate the same parts in the different figures, an electron discharge tube 5 is shown, in Fig. 1, having an anode, cathode, and control electrode. The anode circuit of the tube is energized by a source of current "B". The input circuit of the tube 5 includes an inductance L having in shunt therewith a variable capacity $C_1$, the latter elements cooperating to provide a tuned input circuit for the amplifier system which embodies the tube 5. The negative leg of the filament of tube 5 is connected to a point on the inductance L which has the same potential as the filament, the negative leg, also, being connected to the source "B".

The inherent grid-filament capacity of the tube is designated, Fig. 1, by the dotted capacity 1, the inherent grid-plate capacity being shown as the dotted capacity 3, connected across the grid and plate of the tube 5. A balancing capacity 4 for the grid-plate capacity is connected between the plate and the one end of the inductance L; a second balancing capacity 2, for the grid-filament capacity, being connected in shunt with the lead from the plate to the capacity 4.

The capacities 4 and 2 are so adjusted that the ratios between the inherent tube capacities and the balancing capacities is:

$$\frac{2}{1}=\frac{4}{3}$$

Waves to be amplified are supplies to the input circuit through the winding of inductance L, which may also represent the winding of a transformer, a loop antenna, or similar device. Amplified waves may be transmitted to any predetermined apparatus external to the system shown in Fig. 1 through coupling means electrically connected with the inductance $L_2$.

As is well known in practice, it has been found that the inherent tube capacity 3 provides a feedback path from the anode to the grid of the tube, and, thereby, facilitates the transfer of energy from the output circuit to the input circuit which causes the production of undesired oscillations. In order to neutralize the effect of the capacities 3 and 1, the plate is connected to the filament by a path which includes the balancing condenser 4.

The balancing condenser 2 is likewise employed in the manner shown in order to induce electromotive forces in the coil L in such a manner that they are theoretically equal and opposite to the potential variations which cause the undesired oscillations, the result being that no potential variations are impressed upon the grid so as to cause oscillation.

If the path 6 between the plate and the point on the inductance L which has the same potential as the filament, has an impedance equal to zero, then the same state of affairs exists in the circuit shown in Fig. 1, as is had in the usual and well-known Rice circuit, shown in U. S. Patent 1,-334,118. That is to say, the circuit is subject to parasitic oscillation if the output circuit includes an inductance which is of a relatively small magnitude compared to the inductance in the input circuit.

This phenomenon may be explained by the fact that alternating plate potential causes alternation of grid potential in opposite phase from that of the plate. The phenomenon may also be explained by the fact that the input circuit of the tube 5 contains an inductance, represented by the difference between the self-inductance of coil L and the mutual inductance between its halves, and the output circuit contains an inductance $L_2$. It will therefore be seen that the system which includes tube 5 also includes inductive reactances in both the input and output circuits and capacity coupling between them. Consequently oscillations will be generated in said frequencies for which these reactances cooperate to constitute a resonant circuit.

Now, in order to prevent these reactances inherent in the system from producing oscillations the impedance of the path 6 is increased. It is to be noted with particular care, that if the impedance of the path 6 is very large, alternations of plate potential cause similar phase alternations of grid potential, so that oscillations can never occur, but the amplification of the system is reduced, and this is an undesirable result.

In Fig. 2, I have shown a neutralized amplifier circuit, of the type shown in Fig. 1, in which the input circuit of the tube 5 includes the variable capacity $C_1$ and the inductances $Z_6$, $Z_5$.

The grid-plate capacity is denoted as $Z_3$, the inherent grid-filament capacity is denoted as $Z_1$, the balacing capacity for $Z_1$ is represented by $Z_2$, and the balancing capacity for the grid-plate capacity is designated as $Z_4$. The impedance of the path 6 is designated as R.

The invention consists, then, in providing an impedance in the path 6 of such a magnitude that either, (1) the grid voltage produced by plate potential variation is ninety degrees out of phase with the plate variation, and hence does not either increase or decrease amplification, and therefore cannot produce oscillation; or, (2) the phase of the aforesaid grid voltage is sufficiently near the aforesaid value so that oscillations are not produced in the actual circuit employed. The fundamental purpose underlying my invention and the manner of applying the system so as to provide an amplifier system free from parasitic oscillation, and at the same time not affecting oscillation, will now be set forth.

The actions and reactions taking place in the system, and determining the suppression of parasites are somewhat involved, and make it desirable to employ mathematical formulae in elucidating the laws governing the phenomena taking place in the amplifier system, and in particular these formulae are desirable in laying down rules of design whereby anyone, skilled in the art, may construct the amplifier of this invention.

Assume then, in Fig. 2, that the capacities $Z_1$ and $Z_2$ are equal, and that R is a pure resistance whose magnitude is to be determined. Let Z be the ratio of grid potential to current from grid to filament. Then, $$i_3 = \frac{e_p}{Z_3 + Z},$$

and $$e_g = \frac{e_p Z}{Z_3 + Z}$$

It will be noted that $e_g$ and $e_p$ will be ninety degrees apart in phase, if $$\left(1 + \frac{Z_3}{Z}\right)$$

is a purely imaginary quantity.

Now, from symmetry, we can see that, $$Z = \frac{1}{\frac{1}{Z_1} + \frac{1}{2R + Z_5 - Z_{65}}},$$

so that the ninety degree condition will occur if the real part of $$1 + \frac{Z_3}{Z_1} + \frac{Z_3}{2R + Z_5 - Z_{65}} = 0$$

Substituting as follows:

$$Z_1 = \frac{-j}{\omega C_1}; \quad Z_3 = \frac{-j}{\omega C_3}; \quad Z_5 = j\omega L_5; Z_{65} = j\omega M,$$

it is found that to have the real part vanish, it is necessary to have the following condition:

$$R = \frac{1}{2}\sqrt{\frac{L_5 - M}{C_1 + C_3}}\sqrt{1 - \omega^2(L_5 - M)(C_1 + C_3)}.$$

From this explanation it will be seen that a smaller value of R will give the result at higher frequencies than lower ones. Hence, in practice, it is sufficient to use only enough R to prevent parasitic oscillations, as the regenerative increase in amplification of signal frequencies is an advantage rather than a disadvantage.

For example, to give a typical illustration embodying values: Let $$L_5 - M = 100 \times 10^{-6} \text{ henrys}; \quad c_1 + c_3 = 25 \times 10^{-12}$$
farads.

Then, $$R = 1000\sqrt{1 - \omega^2 \times .0025 \times 10^{-12}}$$

If $\omega$ is in the broadcast band, that is between about $3 \times 10^6$ and $9 \times 10^6$, R remains between 1000 and about 900. But, if the parasite occurs at about $\omega = 19 \times 10^9$, R = to a trifle over 300 ohms will insure the ninety degree relation at the frequency, and hence will not allow the parasite.

If a resistance is used in the path 6 it is important that it be connected between points whose potentials, due to the input signals, are equal. Otherwise, current will flow through 6 with the resulting loss of energy and broadening of tuning. By choosing the impedance in path 6 to have a reactance as well as a resistance, it is possible to make less important the exact point where 6 is connected to the inductance.

In this case, it is necessary to let, $z_6 = R + jX$, and find what pairs of the values of R and X will satisfy the following:

$$1 + \frac{Z_3}{Z_1} + \frac{Z_3}{2(R + jX) + Z_5 - Z_{65}} = \text{pure imaginary.}$$

The required families of the values of R and X are easily enough found, but the solution is tedious and will not be given here, as it is perfectly simple and straight-forward, and is within the abilities of anyone skilled in this art.

It is to be clearly understood as stated heretofore, that it is not claimed that a parasite necessarily occurs in the simple Rice circuit, that is where the impedance of the path 6 is equal to zero, for as a matter of fact the plate circuit may readily be designed so that while the phase of the $e_g$ may be correct for oscillation, the magnitude is of such small value relative to plate potential that oscillations cannot occur. The advantage claimed for the present arrangement is that with a properly chosen value of $Z_6$, any plate circuit whatever may be used, without the occurrence of oscillations at any frequency, and without damping of the tuned circuits or loss of amplification.

Although, for the purpose of explaining the invention, it has been described in connection with a certain specific circuit arrangement, the principles involved are capable of general application to a range of equivalents not specifically described, but which will readily occur to persons skilled in the art, and consequently this invention is to be limited only as indicated by the scope of the appended claims.

What I claim is:

1. A high frequency amplifying system including a tube having grid, filament and plate electrodes and a tunable input circuit including an inductance, said grid being connected to a point on said inductance, a neutralizing capacity being connected to another point on said inductance and said plate, a capacity for balancing the grid-filament capacity of the tube being connected between said latter point and said filament, and a point on said inductance, intermediate the two first points, connected to the filament through an impedance of such magnitude that the flow of parasitic currents of a frequency outside the operating range of the system is diverted from said inductance to the grid-filament capacity and its balancing capacity, thereby causing the total resultant feed-back voltage at parasitic frequencies to be at a phase substantially different from the phase required to sustain parasitic oscillations.

2. A radio frequency amplifying system including a tube having grid, filament and plate electrodes and a tunable input circuit including an inductance, said grid being connected to a point on said inductance, a neutralizing capacity being connected to another point on said inductance and said plate, a capacity for balancing the grid-filament capacity of the tube being connected between said latter point and said filament, and a point on said inductance, intermediate the two first points, connected to the filament through a resistor of such magnitude that the flow of parasitic currents of a frequency outside the frequency range of the system is diverted from said inductance to the grid-filament capacity and its balancing capacity, thereby causing the total resultant feed-back voltage at parastic frequencies to be at a phase substantially different from the phase required to sustain parasitic oscillations.

3. A radio frequency amplifying system including a tube having grid, filament and plate electrodes and a tunable input circuit including an inductance, said grid being connected to a point on said inductance, a neutralizing capacity being connected to another point on said inductance and said plate, a capacity for balancing the grid-filament capacity of the tube being connected between said latter point and said filament, and a point on said inductance, intermediate the two first points, connected to the filament through a resistance of a magnitude of the order of 300 ohms that the flow of parasic currents is diverted from said inductance to the grid-filament capacity and its balancing capacity, thereby causing the total resultant feed-back voltage at parasitic frequencies to be at a phase substantially different from the phase required to sustain parasitic oscillations.

4. A high frequency amplifying system including a tube having grid, filament and plate electrodes and a tunable input circuit including an inductance, said grid being connected to a point on said inductance, a neutralizing capacity being connected to another point on said inductance and said plate, a capacity for balancing the grid-filament capacity of the tube being connected between said latter point and said filament, and means, connected between said filament and a point on said inductance intermediate said two first points, for diverting the flow of parasitic currents of a frequency outside the operating range of the system from the inductance to said grid-filament capacity and its balancing capacity.

5. A high frequency amplifying system including a tube having grid, filament and plate electrodes and a tunable input circuit including an inductance, said grid being connected to a point on said inductance, a neutralizing capacity being connected to another point on said inductance and said plate, a capacity for balancing the grid-filament capacity of the tube being connected between said latter point and said filament, and means, connected between said filament and a point on said inductances intermediate said two first points, for causing the total resultant feedback voltage at parasitic frequencies above the operating range of the system to be of a phase substantially different from the phase required to sustain parasitic oscillations.

6. A high frequency amplifying system including a tube having grid, filament and plate electrodes and a tunable input circuit including an inductance, said grid being connected to a point on said inductance, a neutralizing capacity being connected to another point on said inductance and said plate, a capacity for balancing the grid-filament capacity of the tube being connected between said latter point and said filament, and a point on said inductance, intermediate the two first points, connected to the filament through a resistor of a magnitude of the order of 900 ohms so as to suppress parasitics independently of the amplifying power of said tube.

7. A radio frequency amplifying system including an electron discharge tube having a control electrode, a cathode and an anode and a tunable input circuit including an inductance, said control electrode being connected to a point on said inductance, a neutralizing capacity being connected to another point on said inductance and to the anode, and a resistor between the midpoint of the inductance in the tuned input circuit and the cathode, for causing the total resultant feed-back voltage at parasitic frequencies to be of a phase substantially different from the phase required to sustain parasitic oscillations, said resistor being of a value chosen from a range of values of the order of 300 to 1000 ohms whereby said parasitics may be suppressed whether in the operating range of the system or outside the operating range.

8. A radio frequency amplifying system including an electron discharge tube having a control electrode, a cathode and an anode and a tunable input circuit including an inductance, said control electrode being connected to a point on said inductance, a neutralizing capacity being connected to another point on said inductance and to the anode, and a resistance path, between the midpoint of the inductance in the tuned input circuit and the cathode, to prevent the flow of parasitic currents through the said inductance, said path of a value chosen from a range of values such that said parasitic currents will be suppressed regardless whether the frequency thereof is inside or outside the operating range of the system.

9. In a high frequency network, an electron discharge tube provided with a tunable input circuit including an inductance and an output circuit including a reactive load, a balancing capacity connected between the anode of the tube and a point on said inductance, a second balancing capacity connected between the cathode of the tube and the said point, and a resistor having a magnitude of the order of 300 ohms connected between said cathode and a point on said inductance of higher alternating current potential than said first point to prevent parasitic oscillations of a frequency higher than the operating range of the network.

10. In a high frequency network, an electron discharge tube provided with a tunable input circuit including an inductance and an output circuit including a reactive load, a balancing capacity connected between the anode of the tube and a point on said inductance, a second balancing capacity connected between the cathode of the tube and the said point, and a resistor connected between said cathode and the mid-point of said inductance of a value sufficient to prevent parasitic oscillations of a frequency above the operating range of the network.

11. In an electron discharge tube system, a tube provided with at least a cathode, control electrode and anode, said tube being provided with reactive input and output circuits, capacities for balancing the capacities between the cathode and control electrode and the anode and control electrode of said tube to prevent oscillations at frequencies of the same order of the frequencies of the currents impressed on said input circuit, and a resistor connected between an intermediate point of the reactive input circuit and the cathode cooperating with said balancing capacities to prevent the generation of oscillations in the system at frequencies higher than the frequencies of the currents impressed on said input circuit.

WALTER van B. ROBERTS.